United States Patent [19]

Takemura

[11] Patent Number: 5,171,345
[45] Date of Patent: Dec. 15, 1992

[54] MANUFACTURING METHOD OF AN OPTICAL FIBER COUPLER

[75] Inventor: Koji Takemura, Kanagawa, Japan
[73] Assignee: Kyocera Corporation, Kyoto, Japan
[21] Appl. No.: 748,856
[22] Filed: Aug. 23, 1991
[30] Foreign Application Priority Data Aug. 25, 1990 [JP] Japan ................................ 2-223872
Aug. 25, 1990 [JP] Japan ................................ 2-223873
Jun. 14, 1991 [JP] Japan ................................ 3-143058

[51] Int. Cl.$^5$ ......................... C03B 37/10; G02B 6/28
[52] U.S. Cl. ........................................ 65/4.21; 65/4.3; 385/43; 385/96
[58] Field of Search ................ 65/4.21, 4.3; 385/96, 385/97, 43

[56] References Cited
U.S. PATENT DOCUMENTS 4,798,436 1/1989 Mortimore ........................... 385/43
4,798,438 1/1989 Moore et al. ........................ 385/43

Primary Examiner—Robert L. Lindsay
Attorney, Agent, or Firm—Spensley Horn Jubas & Lubitz

[57] ABSTRACT

The present invention provides a manufacturing method for an optical fiber coupler, the optical characteristic of which is less dependent on wavelength. In the manufacturing method, a coupling region is formed by fusion-bonding and extending parts of a plurality of optical fibers arranged to be closely touching each other. At least one of the optical fibers is extended at a speed different from that of the other optical fibers when a low-temperature heat source is applied to soften the optical fibers. When the temperature of the low-temperature heat source is raised to form a high-temperature heat source, the extended parts of the closely touching optical fibers are fusion-bonded. When the temperature of the high-temperature heat source is then lowered to form a low-temperature heat source again, the fusion-bonded part can be extended further. In one embodiment, the fibers are twisted before fusion bonding the fibers.

11 Claims, 9 Drawing Sheets

FIG. 1 (a-1)
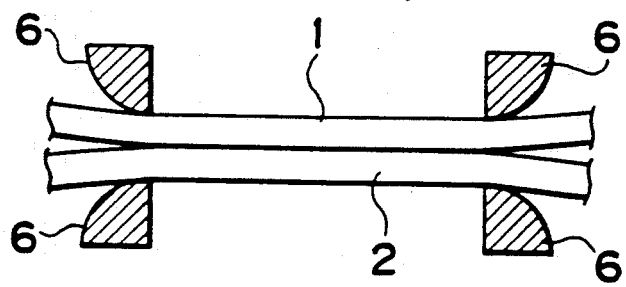
FIG. 1 (a-2)
FIG. 1 (b-1)
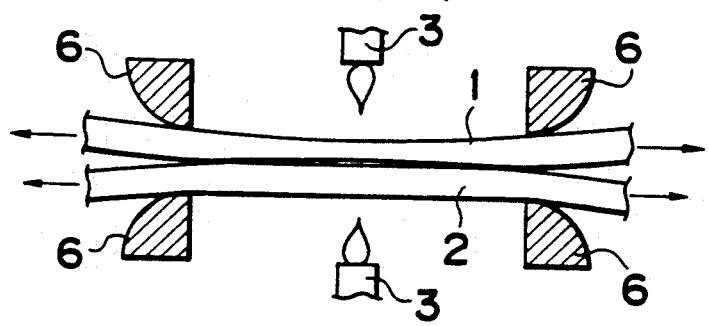
FIG. 1 (b-2)
FIG. 1 (c-1)
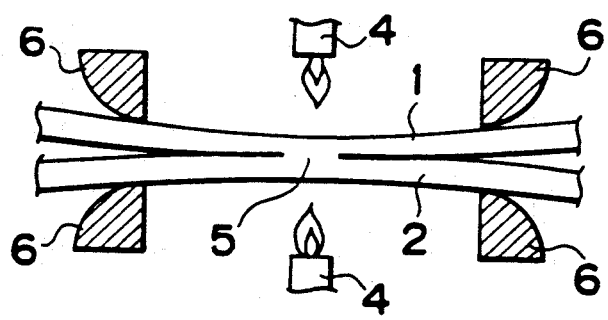
FIG. 1 (c-2)
FIG. 1 (d-1)
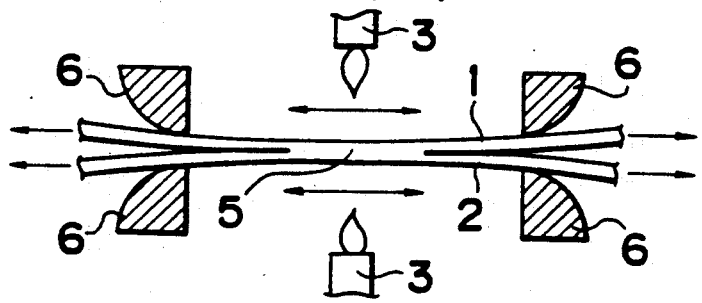
FIG. 1 (d-2)

A-A

B-B

C-C

FIG. 10 (a-2)
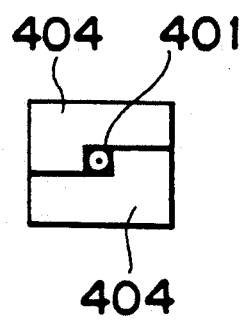
FIG. 10 (a-1)
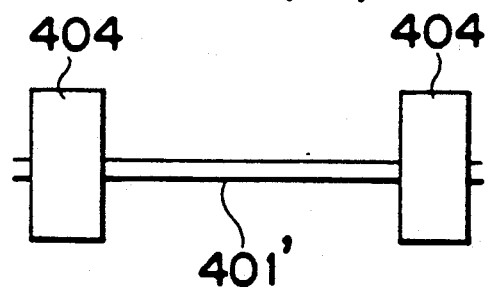
FIG. 10 (b)
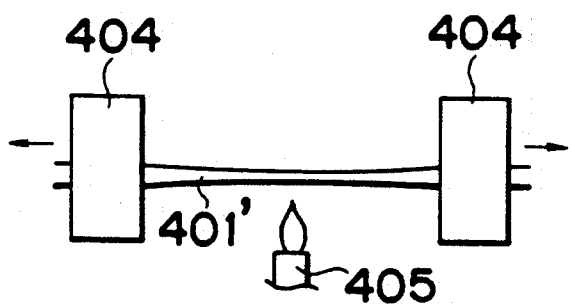
FIG. 10 (c-2)
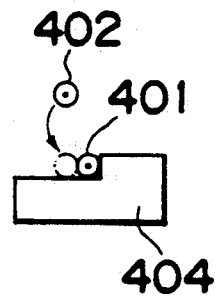
FIG. 10 (c-1)
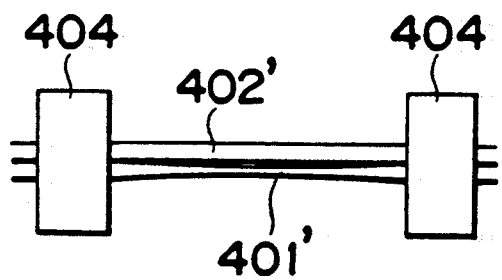
FIG. 10 (d-2)
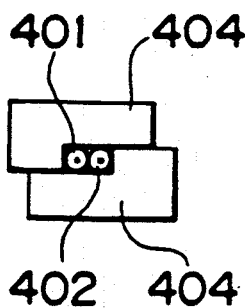
FIG. 10 (d-1)
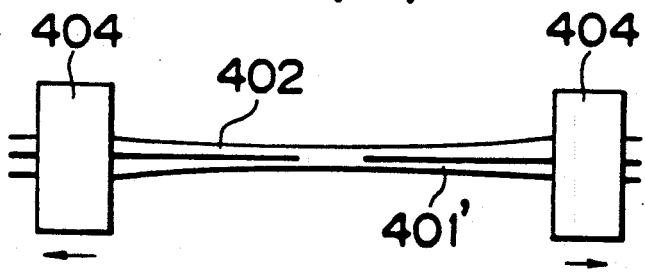

MANUFACTURING METHOD OF AN OPTICAL FIBER COUPLER

BACKGROUND OF THE INVENTION

The present invention relates to a manufacturing method and a manufacturing apparatus of an optical fiber coupler used for an optical fiber telecommunication system, an optical fiber sensor, optical measurement or the like. To be further detailed, the present invention relates to a manufacturing method of an optical fiber coupler having an optical characteriztic which is less dependent on the wavelength, and relates to a manufacturing method for an optical fiber coupler which fabricates an optical fiber having a reproducibility far better than the conventional one, and further relates to a manufacturing apparatus of an optical fiber coupler which extends at least one optical fiber in advance and thereafter fabricates the optical fiber coupler by fusion-bonding and extending these optical fibers.

Conventionally, optical fiber couplers have been used as a passive device which simply divides an inputted optical signal to a plurality of outputs ports, or in reverse, couples optical signals inputted from a plurality of ports into one optical fiber. Particularly, the optical fibers are attracting attention from the points of low loss, a good matching property with the optical fiber being an optical transmission path, easy fabrication and the like.

FIG. 11 shows a conventional low-loss optical fiber coupler. This is fabricated in a manner that a plurality of optical fibers 401 are held in parallel, and parts thereof are heated and fusion-bonded, and are further extended until a desired coupling ratio is obtained. FIG. 12 shows a wavelength characteristic of the coupling ratio of this optical fiber coupler. The abscissa represents the wavelength and the ordinate represents the coupling ratio respectively, and the graph shows that a difference in wavelength causes a difference in coupling ratio. The coupling ratio is 50% at 1.3 μm in wavelength, and when the wavelength becomes larger than 1.3 μm, the coupling ratio also becomes larger than 50%, and when the wavelength becomes smaller than 1.3 μm, the coupling ratio also becomes smaller than 50%. This conventional example has a large dependency of the coupling ratio on the wavelength, and therefore the application thereof is limited for example, it is not suitable for such as the wavelength division multiplex tele-communication system using a plurality of wavelengths.

Also, in fabricating a multi-coupling optical star coupler to improve the close touch and the distribution characteristic, a method is often used which fabricates the coupler while twisting optical fibers in fusion-bonding and extending.

FIG. 13 shows a second example of the conventional optical fiber coupler. This was publicly announced by D. B. Mortimore under the title of Wave-length-Flattened Fused Couplers in Electronics Letters Vol. 21, No. 17, pp742, 1985. This is fabricated in a manner that one of two optical fibers 402 is heated and extended in advance, and the optical fibers having outer diameters differing a little are twisted and closely touched together, and are heated, fusion-bonded and extended. Thereby, the dependency of the coupling ratio on the wavelength can be reduced. FIG. 14 shows an example of the dependency of the coupling ratio of this type on the wavelength. The coupling ratio is 50% at 1.3 μm and 1.5 μm; the coupling ratio is a little larger than 50% between 1.3 μm and 1.5 μm; the coupling ratio gradually varies at 1.3 μm and 1.5 μm. And thereby it can be easily understood that the variation in the coupling ratio is small in comparison with that of the wavelength. Such an optical fiber coupler can be used in a wide wavelength band, and therefore it is also called a wideband optical fiber coupler.

As an example of the wide-band optical fiber coupler, as disclosed in the U.S. Pat. No. 4,798,436, the method of reducing the dependency on wavelength by providing differences among the propagation constants of a plurality of optical fibers is well known. Also, there is a method of fusion-bonding and extending two optical fibers having different refractive indexes of core as described in the U.S. Pat. No. 4,822,126, but this method spoils the matching property of the optical fiber being a transmission path.

In the above-mentioned circumstances, as disclosed in the U.S. Pat. No. 4,798,438, generally there is an approach wherein one of two optical fibers is extended to have a different diameter smaller than the diameter of the other optical fiber in advance, and thereafter it is arranged in a closely touched fashion with the other optical fiber, and fusion-bonded, extended together; and thereby a difference is provided between the propagation constants of the both optical fibers. This fabricating method is called a pre-extension method because one of optical fibers is extended in advance.

However, the optical fiber coupler fabricated by the pre-extension method not only necessitates another process of pre-extension, complicates the manufacturing process, and requires a large-scale apparatus, but also takes much manufacturing time and cost, and therefore this method cannot provide an economical wideband optical fiber coupler.

An object of the present invention is to provide a manufacturing method capable of continuously performing the pre-extension process and the fusion-bonding/extending process which have been conventionally performed separately, and provide a manufacturing method of fabricating an optical fiber coupler with a far better reproducibility than the conventional one, and further provide a manufacturing method of an optical fiber coupler which fabricates the coupler in a manner that at least one optical fiber is extended in advance, and thereafter these fibers are fusion-bonded and extended.

To solve the above-mentioned problem, the present invention has been achieved in a manner that, in a manufacturing method of an optical fiber coupler wherein a coupling region is formed by fusion-bonding and extending parts of a plurality of optical fibers arranged in a closely touched fashion, at least one optical fiber among a plurality of the above-mentioned optical fibers arranged in a closely touched fashion is extended at a speed different from that of the other optical fibers using a low-temperature heat source softening the above-mentioned optical fibers, and the temperature of the above-mentioned low-temperature heat source is raised to form a high-temperature heat source, and then the extended parts of a plurality of the above-mentioned optical fibers arranged in a closely touched fashion are fusion-bonded, and further the temperature of the above-mentioned high-temperature heat source again, and then the above-mentioned fusion-bonded part is extended.

The use of the manufacturing method of the present invention makes it possible to continuously perform pre-extension and fusion-bonding-extension, and therefore not only a small-scale apparatus suffices, but also both process can be performed without removing the optical fibers, and the time required for manufacturing can be reduced to a great extent, and therefore the present invention can provide a wide-band optical fiber coupler at an economical price.

Also, to solve the above-mentioned problem, the present invention has developed a method of manufacturing an optical fiber coupler which consists of a process of arranging in parallel coat-removed parts of a plurality of optical fibers wherein coating of the intermediate part is removed by using arranging jigs disposed in an opposite fashion, a process of extending the above-mentioned plurality of optical fibers by a predetermined length using a low-temperature heat source softening the fibers disposed between the arranging jigs, a process of closely touching the extended parts by rotating at least one of the arranging jigs by an angle at which the parts having the smallest diameter of a plurality of optical fibers contact one another, a process of fusion-bonding the above-mentioned extended parts closely touched by a high-temperature heat formed by raising the temperature of the above-mentioned low-temperature heat source, and a process of lowering the temperature of the above-mentioned high-temperature heat source to form a low-temperature heat source again and extending the above-mentioned fusion-bonded part until a desired coupling is obtained.

The use of the manufacturing method of the present invention not only stabilizes the conditions of fusion-bonding of optical fibers in fusion-bonding, but also extremely improves the reproducibility of the optical characteristic of the fabricated fusion-bond-extension type optical fiber coupler because of fabricating the coupling region without applying twist in fusion-bonding and extending. Particularly, this method is very effective in fabricating a wide-band optical coupler reducing the dependency on wavelength of the coupling ratio of worse reproducibility.

Furthermore, to solve the above-mentioned problem, the present invention has been achieved in a manner that in a manufacturing apparatus of an optical fiber coupler wherein a coupling region is formed by fusion-bonding and extending parts of a plurality of optical fibers arranged in a closely touched fashion, driving beds are installed which independently hold at least one optical fiber among a plurality of the above-mentioned optical fibers and the other optical fibers, and can extend the above-mentioned held optical fibers at speeds different from each other.

The use of the manufacturing apparatus of the present invention makes it possible to perform pre-extension and fusion-bond-extension, and therefore not only can the apparatus be made smaller-sized, but also each process can be performed continuously without removing the optical fibers, and therefore the apparatus of the present invention can reduce the time required for manufacturing, and makes it possible to provide a wide-band optical fiber coupler at an economical price.

BRIEF EXPLANATION OF THE DRAWINGS

FIG. 1(a-1) - FIG. 1(d-2) are schematic process diagrams for explaining a manufactuing method of an optical fiber coupler of the present invention.

FIG. 10(a-1)–FIG. 10(d-2) are concept diagram for explaining the manufacturing method fabricating the optical fiber coupler using the manufacturing apparatus of the present invention.

DETAILED DESCRIPTION OF THE INVENTION

Figure 2:
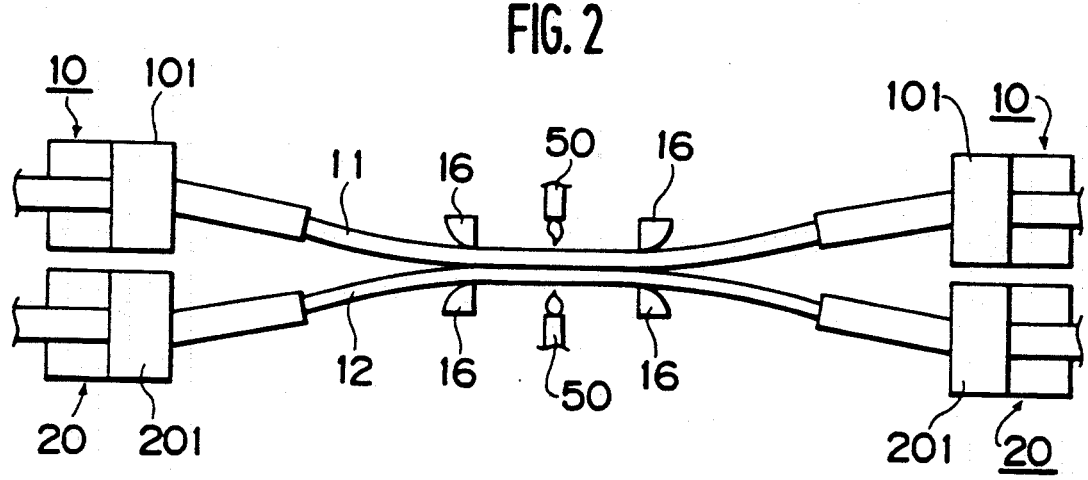
FIG. 2 is a configuration view showing an example of a manufacturing apparatus for manufacturing the optical fiber coupler of the present invention.

Detailed description is made of the present invention. Hereinafter, description is made of a manufacturing method of the present invention while using FIG. 1. Here, a method is shown which fabricates a wide-band optical fiber coupler by fusion-bonding and extending two optical fibers.

First, as shown in FIG. 1(a-1), two optical fibers 1 and 2 wherein portions to become a coupling region are partly coat-removed are arranged in a closely touched fashion using arranging jigs 6 disposed with a predetermined interval kept. FIG. 1(a-2) shows a cross-section of the central parts of the optical fibers 1 and 2 which are arranged in a closely touched fashion by the arranging jigs 6.

Next, as shown in FIG. 1(b-1), the above-mentioned two optical fibers 1 and 2 are extended at predetermined different speeds while being heated using a low-temperature heat source 3 disposed at the central part between the arranging jigs 6. The optical fiber 1 is extended at a speed faster than that of the optical fiber 2, and as shown in FIG. 1(b-2); the optical fiber 1 is formed so as to have a diameter smaller than that of the optical fiber 2. In addition, here, the low-temperature heat source 3 is a heat source of a degree of softening the optical fibers 1 and 2. Also, the stopped state that the extending speed of the optical fiber 2 is zero can also be brought.

Subsequently, as shown in FIG. 1(c-1), a fusion-bonded part 5 is formed in a manner that the above-mentioned two extended optical fibers 1 and 2 are heated and fusion-bonded using a high-temperature heat source 4 formed by raising the temperature of the low-temperature heat source 3 to fuse the optical fibers 1 and 2. FIG. 1(c-2) is a cross-sectional view of the fusion-bonded part 5 at that time.

Finally, as shown in FIG. 1(d-1), the temperature of the high-temperature heat source 4 is lowered to form the low-temperature heat source 3, and the portion having the fusion-bonded part 5 at the center is extended while being heated and swung in the axial direction. FIG. 1(d-2) is a cross-sectional view of the fusion-bonded part 5 at that time.

Here, though not illustrated, in the above-mentioned process, fabrication is performed while monitoring the light inputted from one end of one optical fiber at the other ends of the both optical fibers using a stabilized light source and a two-channel optical power meter. Extending is completed at the point that the coupling ratio of this monitored light reaches a predetermined coupling ratio.

FIG. 2 shows a manufacturing apparatus of an optical fiber coupler which is used for this manufacturing method. Here, numerals 10 and 20 designate driving beds, which have holders 101 and 201 capable of holding optical fibers 11 and 12 independently, and can extend the optical fibers 11 and 12 at different speeds respectively. A heating apparatus 50 is installed at the central part between arranging jigs 16 disposed at a predetermined interval. The heating apparatus 50 uses oxyhydrogen burners or the like, and can control the flow amount of the gases respectively so as to be able to realize a predetermined temperature (low temperatures-high temperatures) in each process. This means that a high-temperature heat source is formed by increasing the flow amount of hydrogen gas, and can be changed to a low-temperature heat source by decreasing the flow amount of the gas.

Figure 3:
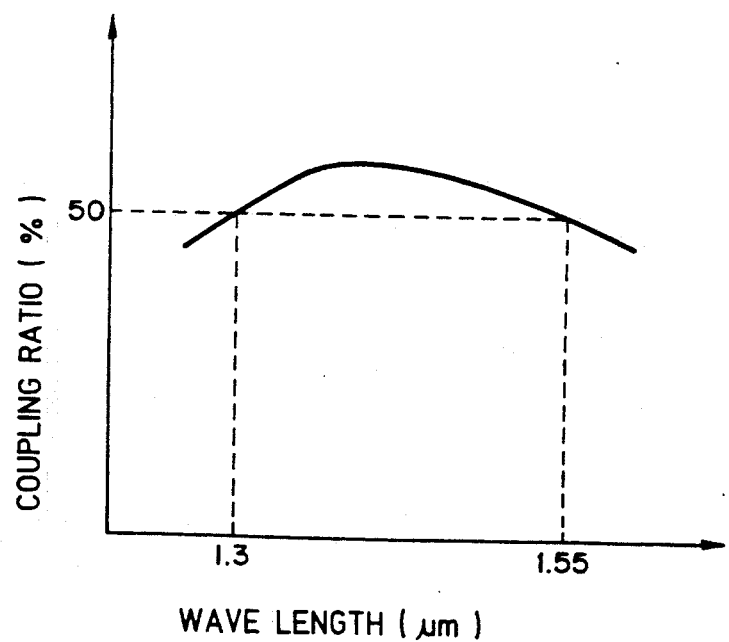
FIG. 3 is a graph showing an example of the dependency on wavelength of the coupling ratio of the optical fiber coupler of the present invention.

FIG. 3 shows an example of the dependency on wavelength of the coupling ratio of an optical fiber coupler fabricated using the method of the present invention. The coupling ratio is nearly 50% between 1.3 μm and 1.5 5 μm in wavelength, and this shows that the coupling ratio is not affected so much by the wavelength. Also, the excess loss of the optical fiber coupler at this time is less than 0.5 dB, being a good result.

Hereinafter, description is made on the next embodiment of the present invention using FIG. 4 through FIG. 6.

Figure 4:
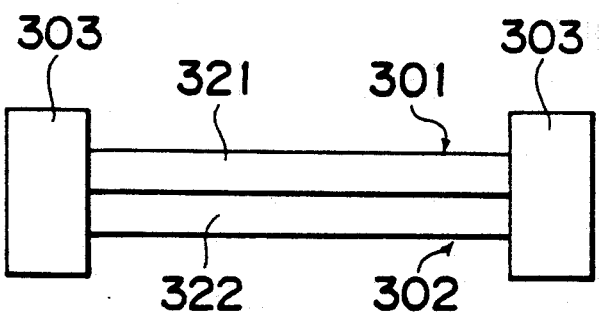
FIG. 4(a)–FIG. 4(e) are concept diagrams showing an example of the manufacturing method of the optical fiber coupler of the present invention.
Figure 4:
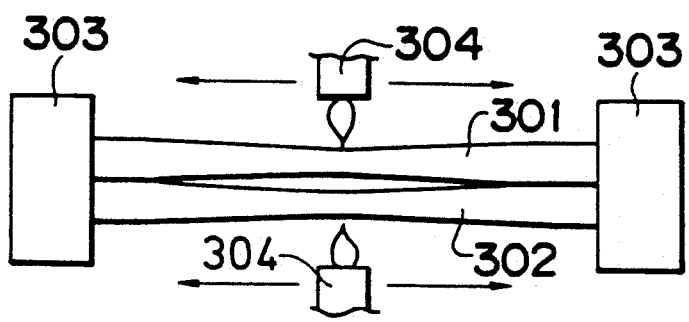
Figure 4:
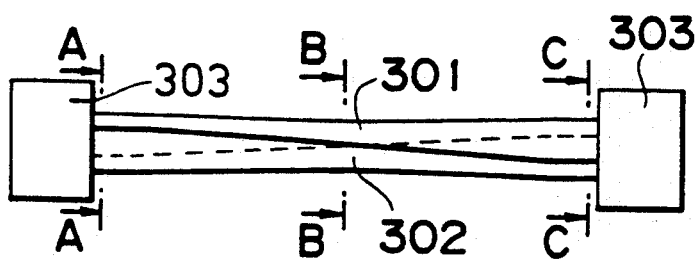
Figure 4:
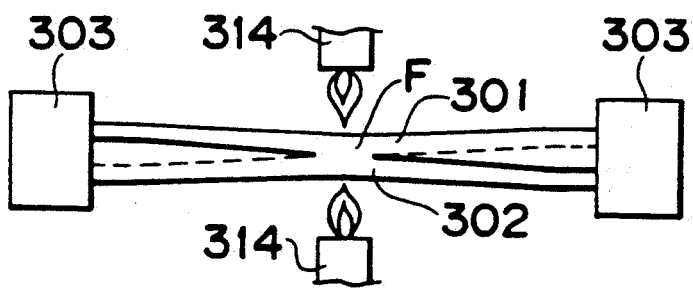
Figure 4:
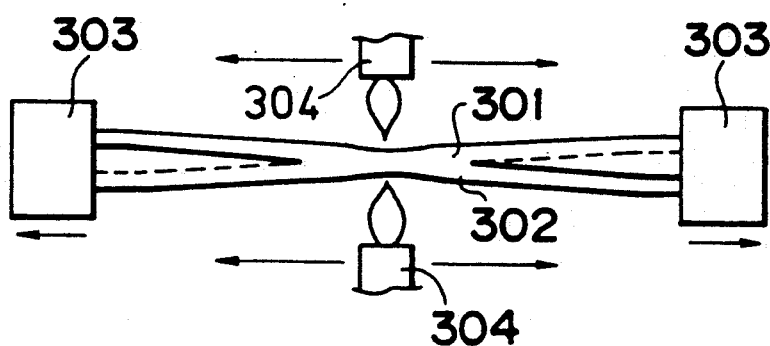

FIG. 4 shows a manufacturing method of an optical fiber coupler by fusion-bonding and extending two single-mode optical fibers 301 and 302 such as SMF-28 ™ manufactured by Corning Co.

In FIG. 4(a), coatings of the intermediate part of the two optical fibers 301 and 302 are partly removed, and the coat-removed parts 321 and 322 are arranged in parallel by arranging jigs 303 disposed with a predetermined interval kept.

In FIG. 4(b), the optical fibers 301 and 302 are extended by a predetermined length while low-temperature heat sources 304 such as oxyhydrogen burners softening the fibers are swung in the axial direction of the optical fibers 301 and 302. The parts having the smallest diameter of the extended optical fibers 301 and 302 are separated from each other without being touched. In addition, the low-temperature heat sources of oxyhydrogen burners 304 is changed to high-temperature heat sources 314 by raising the temperature thereof. Control of the temperature is performed by the flow amount of the gases respectively, and the high-temperature heat sources 314 are formed by increasing the flow amount of hydrogen gas.

In FIG. 4(c), the arranging jigs 303 are rotated by an angle at which the parts having the smallest diameter of the above-mentioned two separated optical fibers 301 and 302 contact each other. As to the rotation of the arranging jigs 303, a configuration of rotating only one arranging jig 303 may be adopted, but here, a configuration of rotating the arranging jigs 303 of the both sides by the same angle in the directions reverse to each other is adopted. As shown in FIG. 6, this is because the positional relation between the parts having the smallest diameter of the optical fibers 301 and 302 is such that a contact point P of the optical fibers 301 and 302 is positioned nearly on the center axis L-L of the low-temperature heat sources 304 such as oxyhydrogen burners and the distance from the low-temperature heat source 304 is constant and the heating condition is stabilized. FIG. 6(b) shows a B-B cross-section of the central part of FIG. 4(c), FIG. 6(a) shows a A-A cross-section of the left end portion of FIG. 4(c), FIG. 6(c) shows a C-C cross-section of the right end portion of FIG. 4(c),and shows the state that the left end portions and the right end portions of the optical fibers 301 and 302 are rotated in the directions reverse to each other. On the other hand, when only one arranging jig 303 is rotated, the contact point P of the optical fibers 301 and 302 becomes hard to be positioned on the center axis L-L of the low-temperature heat sources 304, and the distance from the low-temperature heat source 304 is not constant, and the heating condition becomes unstable.

As to the length of extension of FIG. 4(b), where the optical fibers 301 and 302 of 125 μm in outer diameter are used, when the parts having the smallest diameter of the optical fibers 301 and 302 are extended to become about 89 μm in diameter, by rotating the arranging jigs 303 by 45° in the directions reverse to each other and giving an equal tension from the both ends of the optical fibers 301 and 302, the optical fibers 301 and 302 are closely attached moderately at the parts having the smallest diameter. Here, it was made sure that when two single-mode optical fibers 301 and 302 of R in radius are preliminarily extended and closely attached, the best condition of close touch that the parts having the smallest diameter contact at one point is obtained by taking a sum of the radii of the two portions whose diameters are made smallest by the preminary extension as nearly $\sqrt{2}R$ and taking the rotary angle of each arranging jig 303 as 45° in the direction reverse to each other to become a total angle of 90°.

Figure 5:
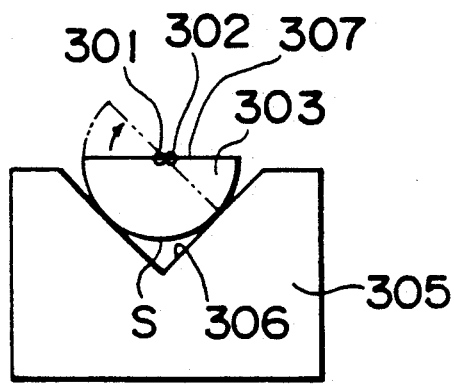
FIG. 5 is a cross-sectional view for explaining an example of a rotary mechanism of an arranging jig used for the present invention.
Figure 6:
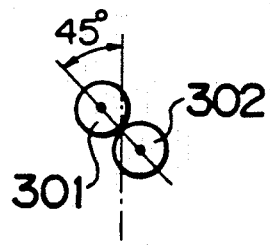
FIG. 6(a)–FIG. 6(c) are cross-sectional views showing the state of arrangement of optical fibers of FIG. 4(c) in each position in the axial direction.
Figure 6:
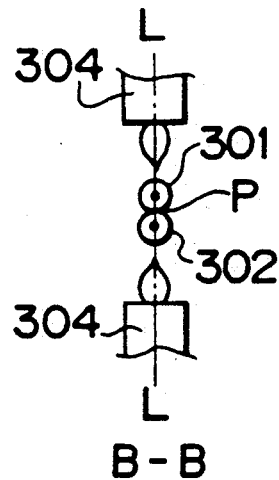
Figure 6:
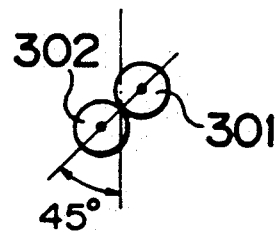

FIG. 5 shows an example of a rotary mechanism of the arranging jig 303. This rotary mechanism is configured in a manner such that the arranging jig 303 includes circular cylinder which is cut into a half in the axial direction and is placed in a precise V-shaped groove 306 of a rotary bed 305. The top surface of the V-shaped groove 306 is finished precisely with the circular outer circumference S of the jig brought in contact with the surface of the groove. The optical fibers 301 and 302 are arranged on a support plane 307 and are set so as to contain the center axis of the cylinder of the arranging jig 303, and the center axis of rotation of the circular outer circumference S of the arranging jig 303 is positioned on the support plane 307, and thereby the arranging jig 303 can be rotated in the forward direction or in the reverse direction on the precise V-shaped groove 306.

Furthermore, in FIG. 4(d), the high-temperature heat source 314 is formed by raising the temperature of the low-temperature heat source 304 by increasing the flow amount of hydrogen gas, and by this high-temperature heat source 314, the extended parts of the optical fibers 301 and 302 which are to be closely attached are fusion-bonded to form a fusion-bonded part F.

Finally, in FIG. 4(e), the temperature of the high-temperature heat source 314 is lowered to form the low-temperature heat source 304 again, and like the case as shown in FIG. 4(b), the fusion-bonded part F is extended until a desired coupling ratio is obtained while swinging the low-temperature heat source 304 in the axial direction of the optical fibers 301 and 302.

In addition, though not illustrated, in each process, light is entered from one end of one optical fiber 301 using a stabilized light source, and the lights outgoing from the other ends of the two optical fibers 301 and 302 are monitored all the time using an optical power meter.

Figure 8:
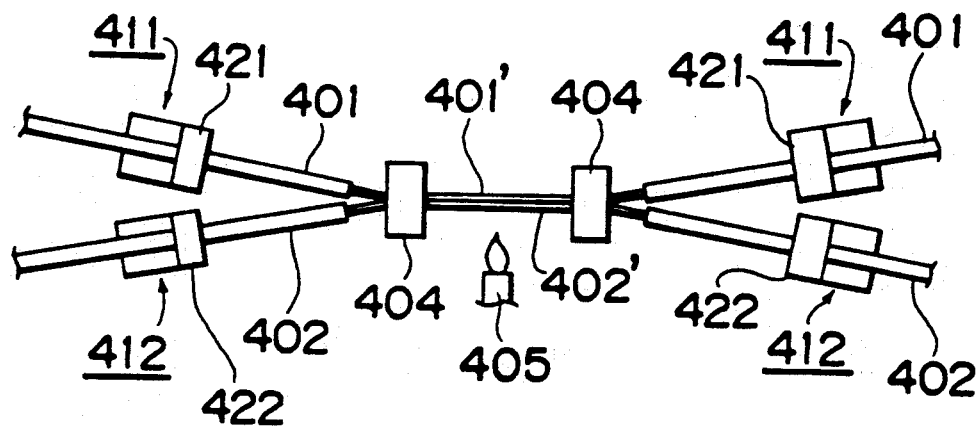
FIG. 8 is a schematic diagram showing an embodiment of the manufacturing apparatus of the optical fiber coupler of the present invention.
Figure 9:
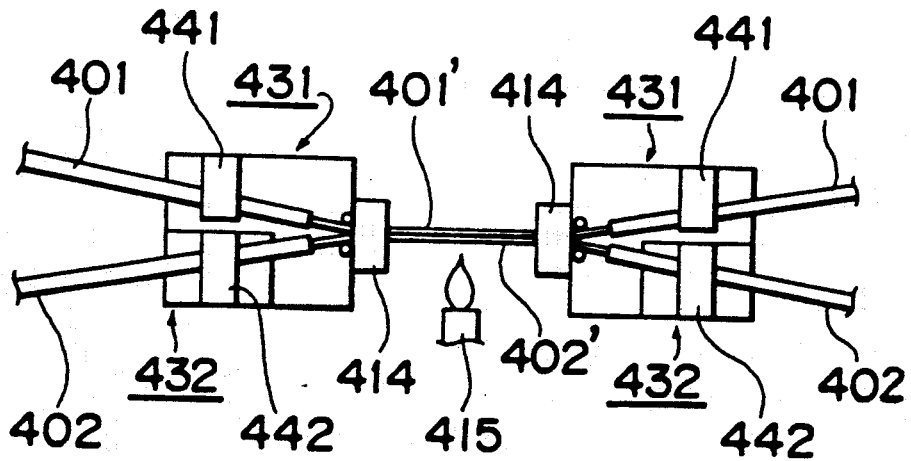
FIG. 9 is a schematic diagram showing another embodiment of the manufacturing apparatus of the optical fiber coupler of the present invention.
Figure 11:
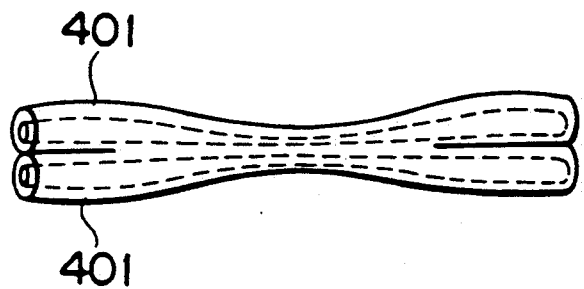
FIG. 11 is a perspective view of a conventional optical fiber coupler.
Figure 12:
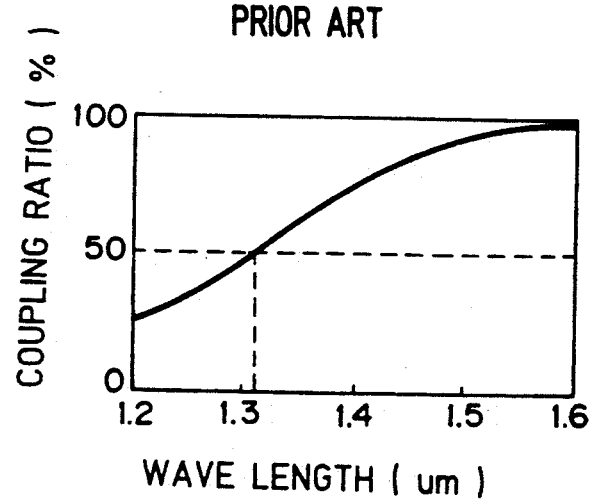
FIG. 12 is a characteristic graph showing a relation between the wavelength and the coupling ratio in the conventional optical fiber coupler.
Figure 13:
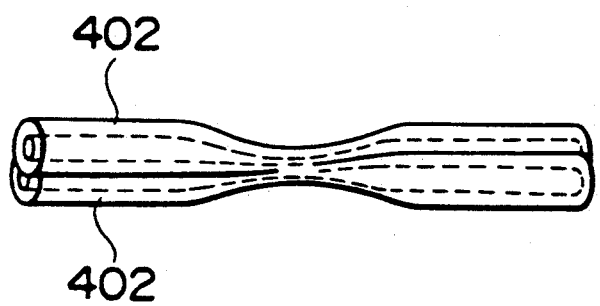
FIG. 13 is a perspective view of another conventional optical fiber coupler.
Figure 14:
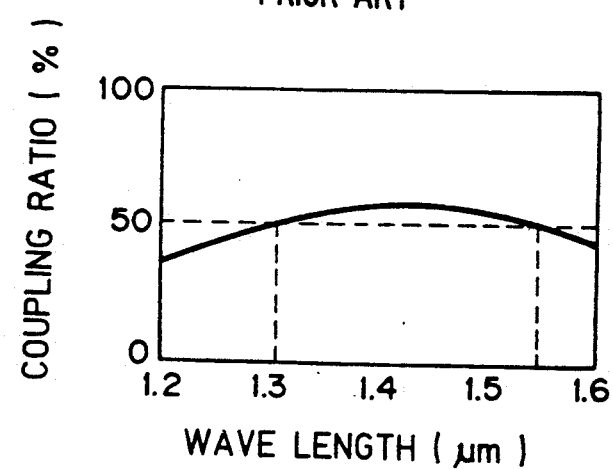
FIG. 14 is a characteristic graph showing a relation between the wavelength and the coupling ratio in the other conventional optical fiber coupler.

The above-mentioned is an example of the optical fiber coupler wherein the coupling ratio has normal dependency on wave-length, but in the case of fabricating a wide-band optical fiber coupler, in the preliminary extension process, the diameters of the parts having the smallest diameter are made to differ from each other by extending the two optical fibers at different speeds using an apparatus capable of extending at least one optical fiber at a speed different from that of the other optical fiber such as manufacturing apparatus of an optical fiber coupler as shown in FIG. 8–FIG. 10, and then the process of FIG. 4(c) and the following processes have only to be performed.

Figure 7:
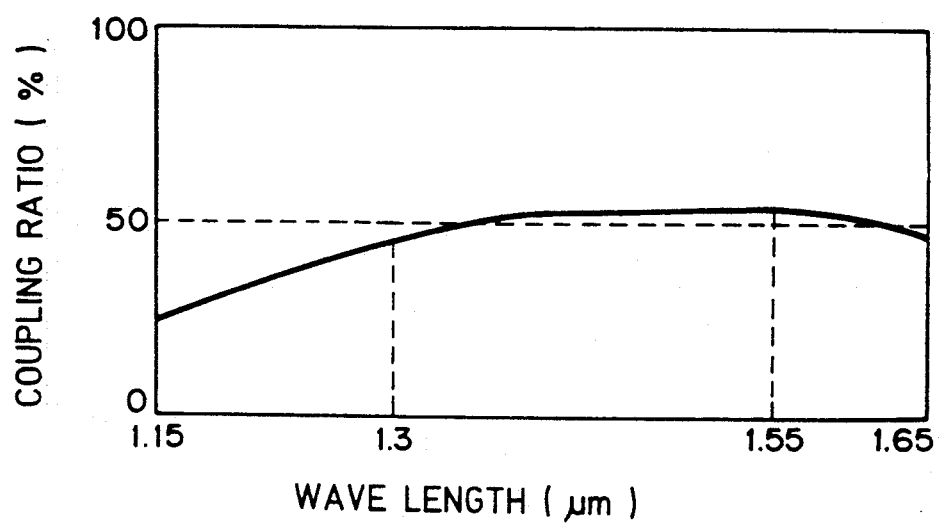
FIG. 7 is a characteristic graph of the wavelength and the coupling ratio of the present invention.

FIG. 7 shows an example of measurement of the dependency on wavelength of the coupling ratio of an optical fiber coupler which is fabricated so that the coupling ratio becomes 50% at 1.3 μm in wave-length by performing the process of FIG. 4, using the manufacturing apparatus as shown in FIG. 8–FIG. 10. The coupling ratio is nearly 50% in the vicinity between 1.3 μm and 1,55 μm in wavelength, and the coupling ratio is smaller than 50% at 1.3 μm in wavelength, and the coupling ratio is larger than 50% at 1,55 μm in wavelength. It was made sure that this sort of wide-band optical fiber coupler which is fabricated using the manufacturing method of the present invention has a good reproducibility and shows nearly the same wavelength characteristic in comparison with the one fabricated using the conventional approach.

In addition, also in the case of extending the above-mentioned two optical fibers of R in radium at different speeds, the best condition of close touch is obtained by taking a sum of two radii at the portions where the diameters are made smallest by preliminary extension as nearly as $\sqrt{2R}$, and by taking the rotary angle of the arranging jigs as 90°, each 45° in reverse direction.

Hereinafter, description is made of manufacturing apparatuses of the present invention according to FIG. 8, FIG. 9 and FIG. 10. Note that, here, examples of fabricating a wide-band optical fiber coupler by fusion-bonding and extending two optical fibers are shown.

As shown in FIG. 8, a pair of driving beds 411 and 412 facing each other are installed whereon at least one of optical fibers 401 and 402 are movable. Optical fiber holders 421 and 422 are provided on the driving beds 411 and 412 respectively. Optical fiber arranging jigs 404 for arranging the optical fibers 401 and 402 having intermediate coat-removed portions 401' and 402' in parallel and in a closely touched fashion are installed with a predetermined interval kept, and a heating apparatus 405 such as an oxyhydrogen burner is disposed at the intermediate portion between the arranging jigs 404.

Next, description is made of a method of fabricating a wide-band optical fiber coupler using this manufacturing apparatus based on FIG. 10.

First, as shown in FIG. 10(a-1), the coat-removed portion 401' of one optical fiber 401 is held on a straight line using the arranging jigs 404 having an L-shaped cross-section which face each other. FIG. 10(a-2) shows an aspect of holding the optical fiber 401 in the arranging jig 404.

Next, as shown in FIG. 10(b), both ends thereof are fixed to the optical fiber holders 421 installed on the driving beds 411. Then, pre-extension is performed by expanding the interval between a pair of driving beds 411 while heating the fibers using the optical fiber heating apparatus 405.

Subsequently, as shown in FIG. 10(c-1), the other optical fiber 402 is coat-removed likewise, and thereafter the coat-removed portion 402' is arranged and held on the arranging jigs 404 in parallel with the extended optical fiber 401, and is fixed on the other pair of driving beds 412 through the optical fiber holders 422. FIG. 10(c-2) shows an aspect of arranging the optical fiber 402 on the arranging jig 404.

Next, as shown in FIG. 10(d-1), a wide-band optical fiber coupler can be fabricated by performing fusion-bonding and extending while moving these two pairs of driving beds 411 and 412 at the same speed. FIG. 10(d-2) shows an aspect of holding the optical fibers 401 and 402 in the arranging jig 404.

As shown in FIG. 9, in this embodiment, in place of two pairs of driving beds 411 and 412 which are configured in a separate fashion in the above-mentioned embodiment, driving beds 432 for extension are carried on driving beds 431 for fusion-bonding-extension. The arranging jigs 414 are installed with a predetermined interval kept, and a heating apparatus 415 is disposed at the intermediate part between these arranging jigs 414. Numerals 441 and 442 designate optical fiber holders.

The manufacturing method using this apparatus is nearly the same as the embodiments as shown in the above-mentioned FIG. 8 and FIG. 10, and can perform fusion-bonding-extension by moving only the driving beds 431 in fusion-bonding-extension after using the driving beds 432 in pre-extension.

In the above-mentioned embodiment as shown in FIG. 9, description is made of the method of fabricating a wide-band optical fiber coupler by fusion-bonding and extending one optical fiber 401 after extending the other optical fiber 402 in advance, but a wide-band optical fiber coupler can be fabricated in a manner that the two optical fibers 401 and 402 are set in advance, and thereafter they are pre-extended with the moving speeds of the driving bed 411 (431) and the driving bed 412 (432) made to differ using a low-temperature heat source of a degree of softening the optical fibers, and thereafter the two optical fibers 401 and 402 are fusion-bonded and extended. In addition, in the case of making the moving speeds differ, the stopped state that one moving speed is zero can also be brought.

FIG. 3 shows an example of the dependency on wavelength of the coupling ratio of the wide-band optical fiber coupler thus fabricated. The coupling ratio is nearly 50% between 1.3 μm and 1.5 μm in wavelength, and it is found that the coupling ratio is not affected so much by the wavelength. Also, the excess loss of the wide-band optical fiber coupler fabricated using the above-mentioned manufacturing apparatus is always less than 0.5 dB, and is similar to the excess loss of the conventional optical fiber coupler having a dependency on wavelength, and can be fit enough for practical use.

Also, a characteristic as shown in FIG. 7 is obtained by closely touching the parts having the smallest diameter by rotating the arranging jigs 404 (414) as described in FIG. 4(c) before performing fusion-bonding and extending as shown in the above-mentioned FIG. 10(d-1).

Also, in the above-mentioned example, two optical fibers are used, but needless to say, an optical star coupler using a number of optical fibers can also be fabricated with good reproducibility without applying twist in fusion-bonding and extending by using a similar configuration.

Also, in the above-mentioned example, single-mode fibers are used, but needless to say, the parts having the smallest diameter can be closely touched and the condition of fusion-bonding is stabilized also when multi-mode fibers are used.

EFFECT OF THE INVENTION

As mentioned above, the present invention is of a manufacturing method of an optical fiber coupler wherein a coupling region is formed by fusion-bonding and extending parts of a plurality of optical fibers fusion-bonded and extended, characterized in that at least one optical fiber among a plurality of the above-mentioned optical fibers arranged in a closely touched fashion is extended at a speed different from that of the other optical fibers using a low-temperature heat source softening the above-mentioned optical fibers, and the temperature of the above-mentioned low-temperature heat source is raised to form a high-temperature heat source, and the extended parts of a plurality of the above-mentioned optical fibers arranged in a closely touched fashion are fusion-bonded, and further the temperature of the above-mentioned high-temperature heat source is lowered to form a low-temperature heat source, and the above-mentioned fusion-bonded part is extended, and by using the manufacturing method of the present invention, pre-extension and fusion-bonding-extension can be performed continuously on the same apparatus, and fabrication can be performed easily like the conventional optical fiber coupler the band of which is not wide, and therefore the present invention can provide an economical wide-band optical fiber coupler.

Also, the present invention is of a manufacturing method of an optical fiber coupler consisting of a process of arranging in parallel the coat-removed parts of a plurality of optical fibers wherein coating of the intermediate part is removed by arranging jigs disposed in an opposite fashion, a process of extending a plurality of the above-mentioned optical fibers by a predetermined length using a low-temperature heat source disposed between the arranging jigs softening the optical fibers, a process of closely touching the extended parts by rotating at least one arranging jig by an angle at which parts having the smallest diameter of a plurality of optical fibers contact one another, a process of fusion-bonding the above-mentioned closely touched extended parts by a high-temperature heat source formed by raising the temperature of the above-mentioned low-temperature heat source, and a process of extending the above-mentioned fusion-bonded part until a desired coupling is obtained with the temperature of the above-mentioned high-temperature heat source lowered to form a low-temperature heat source again, and therefore the present invention can fabricate not only a normal optical fiber coupler (including an optical star coupler) but also a wide-band optical fiber coupler wherein the dependency on wavelength of the coupling ratio is reduced with good reproducibility. Furthermore, in accordance with the present invention, a large extent of improvement in the yield rate is made possible by somewhat changing the conventional manufacturing apparatus, and therefore the present invention can provide an economical optical fiber coupler.

Furthermore, as described above, the present invention is of a manufacturing apparatus of an optical fiber coupler wherein the coupling region is formed by fusion-bonding and extending parts of a plurality of optical fibers, which has the driving beds holding at least one optical fiber among a plurality of the above-mentioned optical fibers independent of the other optical fibers, and can extend them at different speeds respectively, and pre-extension and fusion-bonding-extension can be performed by the same apparatus, and therefore not only the apparatus can be made smaller-sized but also each process can be performed continuously without removing the optical fibers, and therefore the present invention can reduce the time required for manufacturing, and thereby can provide an economical wide-band optical fiber coupler.

What is claimed is:

1. In a manufacturing method for manufacturing an optical fiber coupler wherein a coupling region is formed by fusion-bonding and extending parts of a plurality of optical fibers arranged in a closely touching fashion, the manufacturing method for the optical fiber coupler characterized in that at least one optical fiber of the closely touching fibers is extended at a speed different from that of the other optical fibers using a low-temperature heat source for softening but not fusing said optical fibers, and the temperature of said low-temperature heat source is raised to form a high-temperature heat source, and the extended parts of the plurality of said optical fibers arranged in the closely touching fashion are fusion-bonded using the high-temperature heat source, and further the temperature of said high-temperature heat source is lowered to form a low-temperature heat source again, and said fusion-bonded part is extended using the low-temperature heat source for softening but not fusing the optical fibers.

2. A manufacturing method for manufacturing an optical fiber coupler comprising the steps of:

arranging in parallel coat-removed parts of a plurality of optical fibers wherein an intermediate part is removed by arranging jigs disposed in an opposing fashion;

extending said coat-removed parts of optical fibers by a predetermined length using a low-temperature heat source for softening but not fusing said optical fibers;

arranging the extended parts to be closely touching and adjacent each other by rotating at least one of said arranging jigs by an angle at which the extended parts having the smallest diameter contact one another;

fusion-bonding said closely touching extended parts by applying a high-temperature heat source formed by raising the temperature of said low-temperature heat source; and extending said fusion-bonded parts until a desired coupling is obtained by applying a low-temperature heat source formed by lowering the temperature of said high-temperature heat source for softening but not further fusing the fusion-bonded parts.

3. The manufacturing method of an optical fiber coupler in accordance with claim 2, characterized in that in the step of extending the coat-removed parts by a predetermined length using the low-temperature heat source, at least one optical fiber is extended at a speed different from that of the other optical fibers.

4. The manufacturing method of an optical fiber coupler in accordance with claim 2, characterized in that in the step of arranging the extended parts to be closely touching by rotating the arranging jigs by an angle at which the parts having the smallest diameter of the coat-removed parts contact one another, the opposing arranging jigs are rotated in reverse directions respectively by a half of a desired rotary angle.

5. The manufacturing method of an optical fiber coupler in accordance with claim 4, characterized in that the plurality of optical fibers comprise two optical fibers of radius R, wherein a sum of two coat-removed parts having the smallest diameter is nearly $\sqrt{2}R$, and the desired rotary angle of the arranging jigs is taken as 90°.

6. A method for manufacturing an optical fiber coupler, comprising the steps of:
    applying heat to a portion of at least one optical fiber of a bundle of optical fibers at a temperature sufficiently high to soften the heated portion of the optical fiber but at a temperature sufficiently low to avoid fusing the bundle of fibers together;
    extending the heated portion of the optical fiber;
    applying heat to the bundle of optical fibers at a temperature sufficiently high to fuse at least a portion of the optical fibers together;
    applying heat to a portion of the bundle of optical fibers at a temperature sufficiently high to soften the bundled optical fibers without further fusing the bundle of fibers together; and
    extending the heated portion of the bundle of optical fibers.

7. The method of claim 6, wherein during the step of extending the softened optical fibers before the bundle of optical fibers is fused together, at least one optical fiber is extended at a different speed from the other optical fibers.

8. The method of claim 8, further comprising the steps of:
    arranging the bundle of optical fibers between opposing arranging jigs, wherein the arranging jigs are coupled to the bundle of fibers; and
    arranging the extended heated portion of the optical fiber, before the bundle of optical fibers is fused together, to closely touch the other optical fibers in the bundle by sufficiently rotating at least one of the arranging jigs so that the extended heated portion of the optical fiber having the smallest diameter contacts the other optical fibers in the bundle.

9. The method of claim 8, further comprising the step of rotating the opposing arranging jigs in reverse directions.

10. The method of claim 9, wherein the optical fibers in the bundle have a radius R such that the sum of two optical fibers having the smallest diameter is approximately $\sqrt{2}R$ and the desired rotation of the arranging jigs is 90°.

11. A method for manufacturing an optical fiber coupler comprising the steps of:
    bundling a plurality of optical fibers together in parallel;
    coupling a plurality of arranging jigs to the bundle of optical fibers, the arranging jigs being disposed at opposite ends of an intermediate section of the bundle of optical fibers;
    heating the intermediate section of at least two optical fibers of the bundle of optical fibers at a temperature sufficiently high to soften the heated sections of the optical fibers but at a temperature sufficiently low to avoid fusing the bundle of fibers together;
    extending the heated segments of the optical fibers at different rates so as to reduce the diameter of the heated segment of one fiber relative to the diameter of the heated segment of another fiber;
    twisting the arranging jigs in opposite directions such that an optical fiber in the bundle having the smallest diameter closely touches the other optical fibers in the bundle;
    heating the twisted bundle of optical fibers at a temperature sufficiently high to fuse the intermediate sections of the bundle of optical fibers together;
    lowering the heat applied to the fused twisted bundle of optical fibers such that the bundle of optical fibers is softened; and
    extending the fused twisted bundle of optical fibers.

* * * * *